United States Patent Office 3,376,031
Patented Apr. 2, 1968

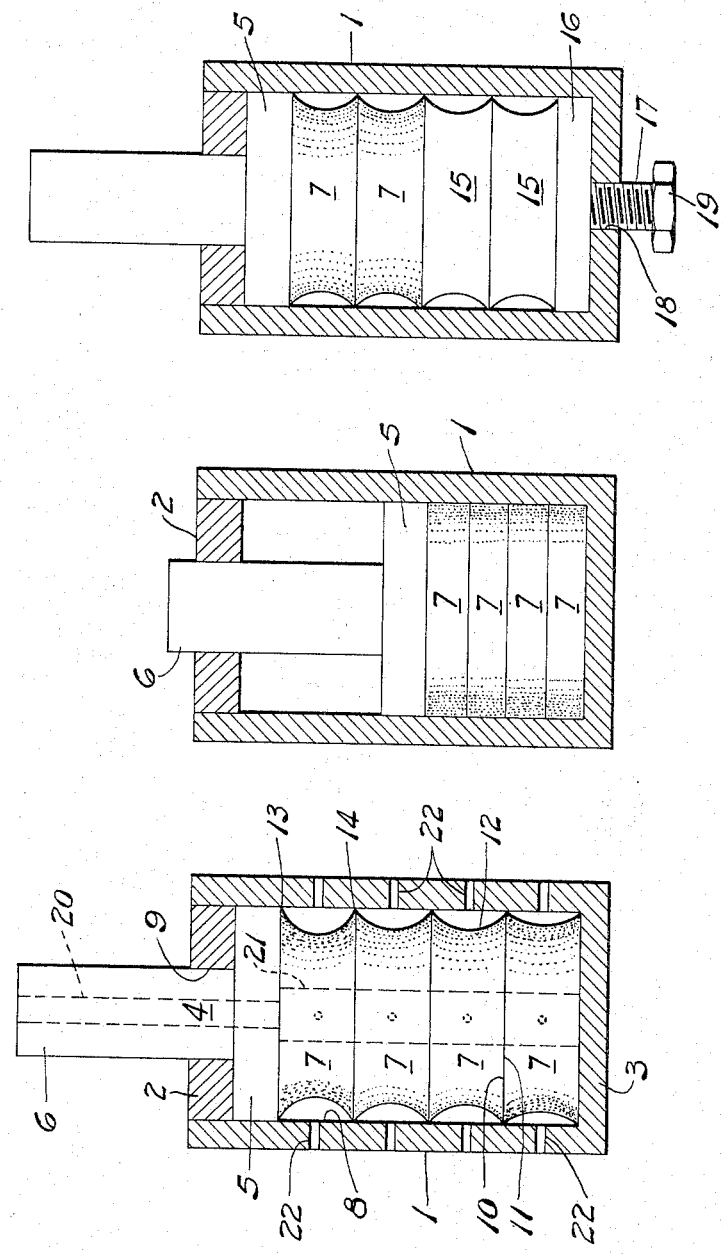

3,376,031
SHOCK ABSORBER
Patrick P. Lee, Tonawanda, N.Y., assignor to
Destech Labs, Inc., Buffalo, N.Y.
Filed Oct. 19, 1965, Ser. No. 497,873
10 Claims. (Cl. 267—1)

ABSTRACT OF THE DISCLOSURE

The shock absorber casing has a cylindrical bore, a transverse wall and a pressure transmitting follower received in sliding engagement within the bore. Between the follower and wall is a column of resilient shock absorber discs each having parallel upper and lower planer bearing surfaces joined by a concavely recessed peripheral side surface having a parabolic section about an axis equidistant from the bearing surfaces, the bearing surfaces of adjacent discs being in direct abutting engagement whereby the energy absorbing material of the discs is continuous throughout the column, and each of the discs prior to deformation engaging the casing bore substantially only along a pair of line surfaces defined by the bearing and side surfaces, thereby stabilizing the column against lateral collapse during deformation.

---

The present invention relates to shock absorbers and more particularly to shock absorbers having shaped resilient energy absorbing elements.

It has heretofore been suggested to provide shock absorbers which utilize the deformation of a resilient material, such as rubber, for energy absorption. It has been found that such shock absorbers are superior to conventional liquid, air or friction type shock absorbers from the standpoint of repeatability, reliability, simplicity and cost. However, shock absorbers formed of resilient material are subject to problems caused by plastic deformation of the material. A further difficulty has been encountered in forming shock absorbers of resilient material which provide both high frequency vibration damping and high load shock absorbing characteristics. Also, such shock absorbers heretofore have been characterized by a relatively low efficiency of energy absorption.

Accordingly, it is a primary object of the present invention to provide a shock absorber formed of resilient material which will permit maximum energy absorption without being subject to failure due to plastic deformation of the material.

A further object is to provide a shock absorber capable of being utilized to both damp high frequency vibrations and absorb high energy inputs.

A still further object of the present invention is to provide a shock absorber wherein the damping characteristics of the shock absorbing material may be varied.

These and other objects and advantages will become apparent from the following description when taken with the accompanying drawings wherein:

FIG. 1 is a view partly in elevation and partly in longitudinal section of a shock absorber of the present invention;

FIG. 2 is a view similar to FIG. 1, but showing the absorber under maximum dynamic loading with the shock absorbing elements fully compressed; and FIG. 3 is a view similar to FIG. 1, but showing an adjustable bearing plate and a combination of elements having different shock absorbing characteristics.

Reference is first made to FIG. 1, wherein the shock absorber of the present invention is shown as including a cylindrical casing 1 having a front retainer wall 2 and a rear end wall 3, a pressure transmitting member 4 having a cylindrical plunger head 5 and a plunger rod 6, and a column of resilient shock absorbing elements or discs 7 of circular transverse section. As illustrated, plunger head 5 is adapted to be received in close sliding engagement within the bore 8 of casing 1 and rod 6 is adapted to project outwardly from casing 1 through aperture 9 provided in the casing front retainer wall 2.

Each disc 7 is provided with upper and lower planer bearing surfaces 10 and 11 which are joined by a concavely recessed peripheral side surface 12. The side surfaces 12 are defined in axial cross section by a parobolic curve drawn about a diametral axis lying in a plane parallel to and equidistant from each of the bearing surfaces 10 and 11. Prior to being subjected to shock absorbing deformation discs 7 engage the bore 8 of casing 1 along a pair of line surfaces 13 and 14 defined by the bearing surfaces 10 and 11 and the recessed peripheral side surface 12. Discs 7 are preferably formed of polyurethane, but other resilient solids such as rubber, viton, nylon, polystyrene may be employed depending upon the damping or energy absorbing characteristics desired.

It will be appreciated that the application of a vibrational or high shock load to rod 6 or casing 1 causes piston head 5 to move within bore 8 to elastically compress discs 7. FIG. 2 illustrates discs 7 as being fully compressed under the maximum dynamic, kinetic energy loading for which the shock absorbing unit is designed. Upon removal of the applied load, discs 7 return piston head 5 to the position illustrated in FIG. 1.

If cylindrically shaped discs were substituted for discs 7, such discs would be prevented from bulging during compression by casing 1 and would be plastically deformed. Plastically deformed discs will not re-position piston head 5 to the position illustrated in FIG. 1.

I have found that by forming the side surface 12 of discs 7 with a parabolic cross-sectional design selected according to the material and location of discs 7, a higher efficiency of energy absorption, on the order of 65–75%, is provided, and discs 7 may be deformed within casing 1 without being subjected to compressive stresses above the optimum or elastic limit of the disc material and without significant friction loss, as illustrated in FIG. 2. This guarantees that maximum energy absorption can be derived from a resiliently deformable material within the smallest cylindrical cross-sectional design.

Also, the side surfaces of the discs would frictionally engage the bore 8 of cylinder 1, absorbing kinetic energy through heat in the manner of a friction absorption device which is undesirable.

The line surface engagement of discs 7 against the bore 8 of casing 1, shown at 13 and 14, is important in stabilizing the column of discs against lateral collapsing during deformation. The desired axial alinement of the discs is maintained without resort to stabilizing inserts or the like, whereby the energy absorbing material of discs 7 is continuous throughout the column. At the same time, because the discs have substantially only line engagement with bore 8 during relative movement, the sliding friction therebetween is very low and does not materially affect the efficiency of absorption.

The shape of concave recesses 12 is selected to permit deformation of discs 7 to a substantially cylindrical wall form, without seeking to bulge beyond such cylindrical form. The particular shape of the recessed side wall therefore depends upon the material used in the disc. I have found that it also depends upon the location of the disc in the column, because the disc 7 closest to piston 5, assuming that the deforming force is applied by piston 5, is loaded first, or faster than the next adjacent disc, on down the column. To avoid the undesirable results of such non-uniform loading, I have found that the recessed wall surface 12 of the disc 7 closest to the moving piston 5, or end wall 3 as the case may be, should have a sharper curvature than succeeding discs, and that succeeding discs along the column should have side wall surfaces 12 of progressively decreasing curvature. In other words, assuming that discs 7 are of the same size and material throughout the column, the parabolic shape of succeeding discs along the column away from the point of force application is on a progressively increasing focus, whereby the discs are equally loaded.

The foregoing variation in parabolic shape is exaggerated in FIG. 1, for ease in illustration.

Front wall 2 may be adjustably positioned axially of casing 1 by any suitable means, not shown, for the purpose of preloading the shock absorbing discs 7. Preloading not only insures that piston head 5 will be returned after compression of the discs to the position shown in FIG. 1, but permits the damping constant of discs 7 to be varied.

FIG. 3 illustrates an alternative embodiment of the present invention, wherein the shock absorber may be provided with both vibration damping and high load energy absorbing characteristics. In this embodiment one or more of the shock absorbing discs 7 may be replaced by discs 15 formed of material, such as rubber, which is capable of absorbing normal vibration frequency inputs. Discs 7 and 15 can be intermixed, and the relative position thereof varied.

FIG. 3 also illustrates alternative means which may be employed in the present invention to vary the damping constant of discs 7. In this embodiment there is provided a bearing plate 16 adapted to be adjustably positioned axially of casing 1 by a rod 17 passing outwardly from casing 1 in threaded engagement with aperture 18 provided in a rear wall 3. Rotation of rod 17 in opposite directions will advance plate 16 toward and away from end wall 3. Rod 17 can be arranged to rotate relative to plate 16, to avoid rotating the latter against the adjacent disc, and a nut 19 can be provided on the outer end of rod 17 to facilitate rotation thereof.

In the practice of the present invention I prefer to provide a plurality of relatively thin shock absorbing discs 7, rather than a single relatively thick disc. I have found that this design adds stability to deformable columns during compression thereof. The discs 7 and 15 are stacked one on the other, with the bearing surfaces 10, 11 of adjacent discs in direct abutting engagement.

Also, to dissipate the heat formed by energy absorption in discs 7, I provide a ventilating passage 20 through plunger 5 and rod 4, communicating with a ventilating passage 21 centrally through the column of discs 7, the passage 21 being of larger cross-sectional area than passage 20. Ventilating passages 22 are provided through casing 1 at spaced points therearound and therealong.

The shock absorber of the present invention may be employed wherever cushioning or damping of vibrations or shocks is desired. Also, the shock absorber of the present invention may be mounted at either or both ends by any suitable means to a supporting structure. While only a compression design has been illustrated, a shock absorber of my invention can operate in tension. For example, one or more discs 7, 15 can be bonded between head 5 and wall 2.

While I have described only certain embodiments of my invention, that has been done by way of illustration and other embodiments of the invention will readily occur to those skilled in the art. Thus, I wish to be limited only by the appended claims. While a simple arcuate configuration is used for the side surfaces 12 in the drawing, that has been done for ease of illustration only, it being understood that they are in fact intended to be parabolic.

I claim:
1. A shock absorber comprising in combination: a casing having a cylindrical bore, an apertured wall and a rear wall; a pressure transmitting member having a follower received in sliding engagement within said bore of said casing and a plunger extending from said follower outwardly from said casing through the aperture in said front wall; and a column of resilient shock absorber discs of circular cross section disposed between and in bearing engagement with said follower and said rear wall, each of said discs having parallel upper and lower planer bearing surfaces joined by a concavely recessed peripheral side surface, said bearing surfaces of adjacent discs being in direct abutting engagement whereby the energy absorbing material of said discs is continuous throughout said column, said side surfaces being parabolic about an axis equidistant from each of said bearing surfaces, and each of said discs prior to being subjected to shock absorbing elastic deformation being in engagement with said bore of said casing substantially only along a pair of line surfaces defined by said bearing surfaces and said recessed peripheral side surface, thereby stabilizing said column against lateral collapsing during deformation.

2. The shock absorber of claim 1, wherein said column includes at least one disc having different energy absorbing characteristics than the other of said discs.

3. The shock absorber of claim 1, wherein said casing is provided with means adjustable axially of said casing to effect pre-loading of said discs.

4. The shock absorber of claim 3, wherein said means is the front wall of said casing.

5. The shock absorber of claim 3, wherein said rear wall is provided with a threaded aperture, and said means comprises a bearing plate disposed between said column and said rear wall and a threaded rod extending from said plate outwardly from said casing in threaded engagement with said threaded aperture.

6. A shock absorber as set forth in claim 1, wherein said parabolic side surfaces of said discs are progressively shallower along said column from said follower.

7. A shock absorber as set forth in claim 1, together with a ventilating passage through said column communicating with a ventilating passage through said follower and said plunger, and ventilating passages through the side wall of said casing.

8. A shock absorber comprising in combination: a casing having a cylindrical bore and a transverse wall; a pressure transmitting member having a follower received in sliding engagement within said bore; and a column of resilient shock absorber discs of circular cross section disposed between and in bearing engagement with said follower and said wall, each of said discs having parallel upper and lower planer bearing surfaces joined by a concavely recessed peripheral side surface, said bearing surfaces of adjacent discs being in direct abutting engagement whereby the energy absorbing material of said discs is continuous throughout said column, said side surfaces being parabolic in transverse cross-section about an axis equidistant from each of said bearing surfaces in axial cross-section, and each of said discs prior to being subjected to shock absorbing elastic deformation being in engagement with said bore of said casing substantially only along a pair of line surfaces defined by said bearing surfaces and said recessed peripheral side surfaces, thereby stabilizing said column against lateral collapsing during deformation.

9. The shock absorbing element of claim 8, wherein said material comprises polyurethane.

10. The shock absorbing element of claim 8, wherein each of said side surfaces defines with said cylindrical bore a volume substantially no more than required to accommodate the flow of material of the associated disc when said disc is subjected by a force applied normal to said bearing surfaces to maximum compressive stress within the elastic range of said material.

References Cited

UNITED STATES PATENTS

| | | | |
|---|---|---|---|
| 2,713,483 | 7/1955 | Tillou | 267—63 |
| 2,903,143 | 9/1959 | Gadbeis | 213—32 |
| 3,039,757 | 6/1962 | Barr | 267—1 |
| 3,134,585 | 5/1964 | Trask | 267—1 |
| 3,202,412 | 8/1965 | Trask | 267—1 |
| 3,227,288 | 1/1966 | Mulcahy et al. | 213—45 |

FOREIGN PATENTS 1,236,420   6/1960   France.

ARTHUR L. LA POINT, *Primary Examiner.*

R. M. WOHLFARTH, *Assistant Examiner.*